Aug. 26, 1969     R. L. LAMONDE ET AL     3,463,901
METHOD OF ELECTRON BEAM WELDING AND PRODUCTS THEREOF
Filed April 30, 1968
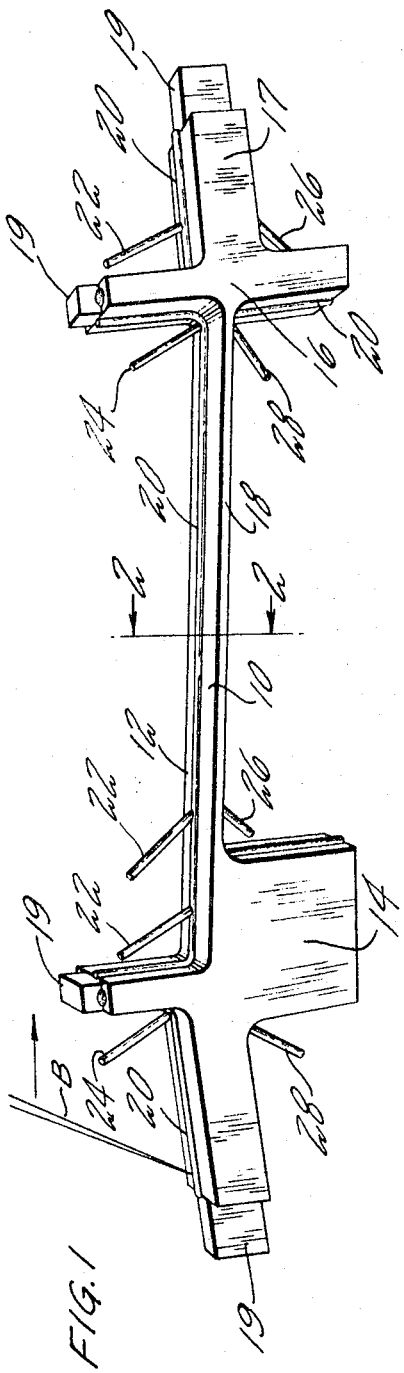
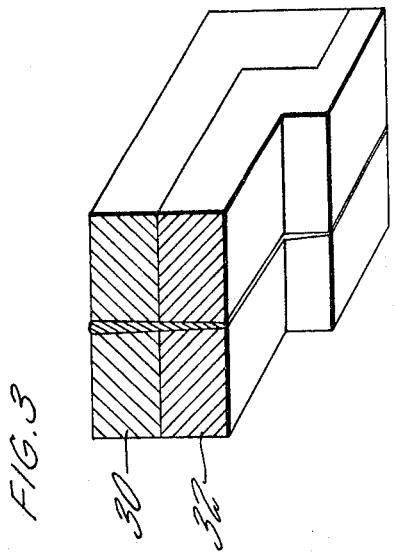
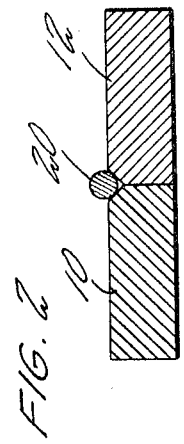
INVENTORS
ROMEO L. LAMONDE
JOHN J. FIEDORWICY
BY John C. Lindeman
AGENT United States Patent Office 3,463,901
Patented Aug. 26, 1969

3,463,901
METHOD OF ELECTRON BEAM WELDING AND PRODUCTS THEREOF
Romeo Leon Lamonde, Glastonbury, and John Joseph Fiedorowicz, Cromwell, Conn., assignors to United Aircraft Corporation, East Hartford, Conn., a corporation of Delaware
Filed Apr. 30, 1968, Ser. No. 725,382
Int. Cl. H05b 7/18
U.S. Cl. 219—121                                10 Claims

ABSTRACT OF THE DISCLOSURE

This disclosure relates to a method of welding and the welded article formed by means of a high intensity beam such as an electron beam. The disclosure is concerned particularly with workpieces which have varying thicknesses along the plane of the desired weld seam and employs elongated segments of filler material attached to the workpieces in the welding plane at locations along the desired weld seam where the thickness changes abruptly. The elongated segments of filler material may be slanted in the plane swept by the welding beam so that the beam impinges on the projecting ends of the segments and melts small portions of the segments progressively as the beam advances along the seam.

Background of the invention

The invention relates to welding with a high intensity beam such as an electron beam. The invention is particularly directed to welding articles which have a varying or irregular thickness along the plane of the desired weld seam.

Electron beam machines, as they are generally known, are devices which use the kinetic energy of an electron beam to work a material. U.S. Patent No. 2,987,610, issued June 6, 1961 to K. H. Steigerwald, discloses such a machine. These machines operate by generating a highly focused beam of electrons. The electron beam is a welding, cutting and machining tool which has practically no mass but has high kinetic energy because of the extremely high velocity imparted to the electrons. Transfer of this kinetic energy to the lattice electrons of the workpiece generates higher lattice vibrations which cause an increase in temperature within the beam impingement area sufficient to accomplish work. In the welding process, the electron beam above a given power density can produce a highly heated channel of molten metal which may completely penetrate the workpieces. As the penetrating beam advances along the workpieces, the molten metal flows around the beam and upon cooling solidifies to form the weld. Deep welds which have depth-to-width ratios better than 40:1 can be formed by the electron beam.

In the past, welding workpieces which have different thicknesses at various locations along the weld seam has required special preparation before welding with a high intensity beam. It was customary to add filler blocks of solid, laminated, sintered, or powdered material as backups throughout the thin regions of the workpieces in order to create a constant working thickness through which the beam would penetrate during the welding process. Alternatively, without the filler blocks, it was necessary to adjust the beam intensity, if possible, as it passed between thick and thin regions of the workpiece in order to avoid burn-through or undercutting. Burn-through leaves a hole in the seam at the thin region of the workpiece and undercutting is a condition where insufficient material fills the upper bead formed at the surface struck by the impinging beam. If a low-power beam was used to prevent burnthrough in the thin sections, an incomplete weld might exist at the bottom bead of thick sections due to insufficient beam penetration.

In the prior art process where the thinner sections of the workpieces are built up with filler blocks, it is necessary after welding to subject the pieces to a costly machining process in order to remove the filler blocks which become fused to the workpieces during the welding process. It is, therefore, desirable to eliminate the need for filler blocks which must be machined away after the welding process.

The alternative prior art method of adjusting the intensity of a working beam as the pieces are swept by the beam has practical problems. The beam intensity must be adjusted in correspondence with transitions in the thickness of the metal at the precise time of beam impingement as the beam advances along the weld seam. The beam is not always visible and therefore only the heating effects of the beam can be observed. In view of the errors caused by transients in the heating effect, the progressive movement of the workpieces, the visibility of the beam, the operator's proficiency or the accuracy of an automated beam follower, and other factors, it is desirable to be able to weld articles of varying thickness along the weld seam without having to adjust the beam intensity during the welding process.

Summary of the invention

This invention relates to a method of welding and the welded article formed by a high intensity beam penetrating two workpieces of varying thickness along a desired weld seam. The method permits the use of a beam of constant intensity and does not require the use of filler blocks which must be machined away after the welding process.

Experiments have indicated that a beam of constant intensity and welding speed can produce good welds withing the different portions of the articles where thicknesses differ by a factor of 20:1 or more. For example, good butt welds have been made with a beam of constant intensity within different portions of titanium workpieces which had thicknesses of 0.1 inch and 2.8 inches. The problems with these welds arise at the regions of the weld where the beam advances across abrupt changes in thickness.

As the beam passes from thick to thin sections, a hole, characteristic or burn-through, is left in the seam. One explanation for this hole is that the penetrating beam while in the thick portion of the workpieces is surrounded by a large quantity of molten fluid which will flow around an advancing beam to form the weld. Upon emerging from a thick portion of the workpiece, a large quantity of molten material is effectively stolen from the thin section to such extent that insufficient molten material is left to fill the seam at the beginning of the thin portion of the workpiece.

Other faults such as undercutting appear in the filler areas where the beam passes from thin portions of the workpiece to thicker portions. No explanation for these faults is offered.

The new method of welding workpieces having varying thicknesses employs elongated segments of filler material which are positioned at an angle to the workpieces and in the plane of the desired weld seam. These segments may be tack welded in place in preparation for the welding pass of the high intensity beam. As the high intensity beam advances along the desired weld seam, it impinges upon and melts the filler segments.

The elongated segments are located along the weld seam at positions where the beam advances between portions of the workpieces having different thicknesses since faults are expected to occur in these regions as described above. It is therefore an important teaching of my invention to position additional filler segments at selected locations along the weld seam rather than cover entire sections of the workpieces with filler blocks.

Each elongated segment may be slanted slightly in the direction of approach of the beam so that the beam need only penetrate and melt a small portion of the segment as it advances along the seam. Surface tension of the melted material will cause the material to adhere to the unmelted part of the slanted segments and consequently a large quantity of filler material will be deposited in the region of the weld seam where the segment was located. This slanting allows the use of longer segments and avoids an abrupt change in the apparent penetration depth of the beam which seems to cause undercutting at transitions in workpiece thickness.

Additionally the effects of the thickness variations along the workpiece may be minimized by angling the beam with respect to the workpieces.

A further teaching of my invention is the placement of the filler segments on opposite sides of the workpiece so that a penetrating beam will impinge upon the segments on both sides and thusly deposit a large amount of filler material in the selected locations of the weld seam.

Brief description of the drawings

FIG. 1 shows a pair of articles which have an irregular thickness along the desired weld seam and which have been prepared for butt welding according to the present method.

FIG. 2 is a sectional view of the articles taken along line 2—2 of FIG. 1.

FIG. 3 shows a pair of articles which have been welded together in overlapping fashion according to the present method.

Description of the preferred embodiments

Reference to FIGS. 1 and 2 discloses two articles 10 and 12 butted against one another. The electron beam B penetrates and melts a portion of each of the articles at their interface as the beam B sweeps through the plane of the interface from one end of the articles to the other. It will be understood that the sweeping motion of the beam B can be accomplished by either holding the articles 10 and 12 stationary while the beam is deflected or by holding the beam stationary and moving the articles under the beam.

It will be noted from FIG. 1 that the thickness of the articles in the direction of the beam penetration varies from location to location along the interface of the articles where the weld will be formed. The particular articles 10 and 12 shown may represent sections of a large annular ring which forms a part of a fan exit casing in a turbofan engine. The thickened portions 14 and 16 may represent stand-offs for supporting the ring and the central portion 18 may represent an intermediate wall of the casing.

Although the different portions of irregularly shaped articles may be provided for distinct reasons, it is nevertheless desirable for reliability that each of these portions form a single structural unit. One approach to this end starts with a large casting which must be subjected to a number of costly machining steps. In another approach to which this invention applies, a number of smaller pieces can be welded together. Welding by means of a high intensity beam has become an ideal manufacturing process because of the superior welds which are formed. Special techniques, however, are required for welding irregularly shaped articles which more nearly approximate the shape of the finished product if expensive machining steps are to be avoided.

It is a standard beam-welding practice to attach run-off blocks 19 at the edges or projections of the workpieces to prevent scarfing in the weld seam. Scarfing is a severe undercutting at the edges of the impinged surface. The use of strips 20 of filler material lying along the desired weld seam as in FIGS. 1 and 2 is old according to U.S. Patent No. 1,826,355 to Lincoln. However, it has been found that the strips 20 do not provide sufficient filler material in beam welding to avoid the faults created at the transitional sections of the weld seam where article thickness varies abruptly. In order to minimize the effect of the abrupt change in the article thickness and also to minimize the maximum difference in penetration depth, the beam may, depending on workpiece configuration, be advantageously angled with respect to the workpieces as shown in FIG. 1. It is most important, however, that elongated segments 22, 24, 26 and 28 of filler material projecting away from the workpieces at an angle in the plane of the desired weld seams be located at selected positions along the desired weld seam to aid in the formation of a deeply penetrating weld of uniform solidity throughout. The segments can be tacked by resistance welding directly to the strips 20 or the workpieces, if no strips are used.

It is an important teaching of the invention that the segments be located in the vicinity of transitions in the width of the interface of the articles. Where the beam sweeps from a thick portion 14 to the thin portion 18 or from thick portion 16 to thin portion 17, a characteristic hole has been found in the weld seam as described above. Therefore, segments 22 and 26 are located in such a vicinity in order to eliminate this characteristic hole. In regions where the beam sweeps from a thin portion to a thick portion, the characteristic undercutting occurs in the weld seam as was described above. For this reason, segments 24 and 28 are located at thin-to-thick transitions in order to eliminate faults in the weld seam.

The segments of filler material will be impinged upon and melted as the beam B penetrates the articles and sweeps along the worpieces. The segments can be slanted in the plane swept by the beam toward the direction from which the beam approaches as indicated in FIG. 1. By slanting the segments in this manner, the beam advancing in the direction of the arrow will impinge on the projecting ends of each segment and surface tension will cause the melted material to adhere to the remainder of the segment and eventually be deposited at the attaching point on the weld seam: In this manner, a large quantity of filler material can be deposited at desired stations along the weld seam where faults might otherwise occur.

It is a further teaching of the invention that the segments of filler material be located on opposite sides of the workpieces. For example, segments 22 and 24 each have corresponding segments 26 and 28 projecting from the side of the articles opposite to the surface of the articles on which the penetrating beam first impinges. With segments located on both sides of the weld seam, it is possible to deposit larger amounts of filler material at one station.

In conclusion, the present method of welding articles of varying thickness is accomplished with a beam of constant intensity and without the need for large blocks of filler material which must be machined away or without varying beam intensity at transitional regions of the weld.

While a preferred mode has been shown and described, various modifications may be made without departing from the scope and spirit of the invention. For example, although the invention has been described with particular relation to welding sections of a gas turbine casing, it is not limited in this respect but may be applied to any workpieces in which the weld penetration varies substantially along the seam. For example, the method can be employed to form welds normal to overlapping surfaces of workpieces 30 and 32 as shown in FIG. 3 in contrast to welds between the abutting surfaces of workpieces 10 and 12 shown in FIGS. 1 and 2. Although the invention is described particularly with an electron beam, other high energy beams such as the laser may be employed.

The invention, therefore, is not limited to the specific embodiments illustrated and described but may be used in other ways without departure from its spirit as defined by the following claims.

We claim:

1. A method of welding articles having a variable thickness in the plane of a desired weld seam by means of a high intensity beam including the step of selectively locating a segment of filler material at an abrupt change in workpiece thickness, the segment projecting from the surface of at least one of the articles in the plane swept by the beam, and being so slanted with respect to the beam axis that the high intensity beam will intercept the projecting end of the segment and progressively melt the segment as the articles are traversed by the beam.

2. The method of claim 1 wherein:
   (a) the high intensity beam penetrates the articles from one side and exits through the opposite side; and
   (b) such segments are located to project from the articles at both the one side and the opposite side.

3. The method of claim 1 wherein locating the segment of filler material includes the step of tack welding the segment to at least one of the articles.

4. The method of claim 1 wherein the beam is angled with respect to workpieces and in the plane of the desired weld seam to minimize the effect of the variations in thickness.

5. An article welded by the method of claim 1.

6. In a method of welding by means of a penetrating beam of charged particles in which the workpieces to be welded have portions of different thicknesses in the direction of beam penetration, the preparatory step of positioning elongated elements of a filler material along the desired weld seam at stations where the penetrating beam sweeps between portions of the workpieces having different thicknesses, the elements extending away from the workpieces toward the direction of approach of the penetrating beam and in the plane swept by the beam welding the workpieces.

7. In the method of claim 6 the additional step of angling the beam wtih respect to the workpieces to minimize the maximum difference in penetration depth.

8. In the method of claim 6 the step of positioning further including locating the elongated elements along the desired weld seam on the workpiece surface opposite to the surface on which the penetrating beam impinges.

9. A method of welding articles along an interface of abruptly varying width comprising:
   (a) positioning the articles adjacent one another in a desired configuration;
   (b) attaching to the articles at the abrupt variations in width an element of filler materials projecting from the exposed surface of the articles in the plane of the interface; and
   (c) sweeping a high intensity beam of electrons through the plane of the interface between the articles, the angular relationship between the beam and the element being selected so that the sweeping beam intercepts the projecting end of the element before the beam intercepts the attached end of the element.

10. The method according to claim 9 wherein:
   (a) the step of attaching includes slanting the projecting elements toward one extremity of the interface; and
   (b) the sweeping of the beam is initiated at the same extremity.

References Cited
UNITED STATES PATENTS

| | | | |
|---|---|---|---|
| 1,597,488 | 8/1926 | Steenstrup | 29—494 |
| 1,980,561 | 11/1934 | Wagner | 219—137 |
| 2,996,600 | 8/1961 | Gardner et al. | 29—498 |
| 3,165,619 | 1/1965 | Cohen. | |
| 3,183,066 | 5/1965 | Lessmann et al. | 219—137 |

JOSEPH V. TRUHE, Primary Examiner

W. DEXTER BROOKS, Assistant Examiner

U.S. Cl. X.R.

29—498, 499, 500